(12) United States Patent
Spyropulos et al.

(10) Patent No.: US 7,623,061 B2
(45) Date of Patent: Nov. 24, 2009

(54) METHOD AND APPARATUS FOR DISCRIMINATING WITH RESPECT TO LOW ELEVATION TARGET OBJECTS

(75) Inventors: Charles Thomas Spyropulos, Saugus, MA (US); Michael John Paradie, Hollis, NH (US); Clyde Maynord Callewaert, Shelby Township, MI (US)

(73) Assignee: Autoliv ASP, Ogden, UT (US)

( * ) Notice: Subject to any disclaimer, the term of this patent is extended or adjusted under 35 U.S.C. 154(b) by 194 days.

(21) Appl. No.: 11/560,196

(22) Filed: Nov. 15, 2006

(65) Prior Publication Data
US 2008/0111733 A1  May 15, 2008

(51) Int. Cl.
*G01S 13/00* (2006.01)
(52) U.S. Cl. ............... 342/70; 342/170; 342/189
(58) Field of Classification Search ............ 342/70
See application file for complete search history.

(56) References Cited

U.S. PATENT DOCUMENTS

| | | | |
|---|---|---|---|
| 4,450,446 A * | 5/1984 | Clancy et al. | 342/98 |
| 5,241,317 A | 8/1993 | Howard | |
| 6,266,005 B1 | 7/2001 | Schneider | |
| 6,377,205 B1 * | 4/2002 | Eckersten et al. | 342/90 |
| 6,429,804 B1 * | 8/2002 | Kishida et al. | 342/70 |
| 2003/0223480 A1 * | 12/2003 | Cafarella | 375/219 |

FOREIGN PATENT DOCUMENTS

| EP | 1 351 069 A1 | 10/2003 |
|---|---|---|
| WO | WO 99/27384 | 6/1999 |

OTHER PUBLICATIONS

"Over-the-Horizon Skywave Radar Target Localization" J. Krolik et al. Duke University—Department of Electrical and Computer Engineering 1999 Lincoln Laboratory ASAP Workshop, 22 pages.
Kolawole, Michal: "Radar Systems, Peak Detection and Tracking" Radar Systems, Peak Detection and Tracking, Newnes, Oxford, GB, 2002, pp. 314-347, XP002461808.
European Search Report, Application No. EP 07 12 0250.

* cited by examiner

*Primary Examiner*—Thomas H Tarcza
*Assistant Examiner*—Timothy A Brainard
(74) *Attorney, Agent, or Firm*—Sally J Brown; Saul Ewing LLP

(57) ABSTRACT

The invention concerns a method and apparatus for estimating a height of a target object using radar signals reflected from the target object wherein a receiver detects a plurality of radar signals reflected from the target object, respectively, at a plurality of different ranges, resolves the amplitudes of the plurality of reflected signals at the respective plurality of different ranges to generate an amplitude data set, and determining if the amplitude data set correlates to a particular height.

27 Claims, 4 Drawing Sheets

METHOD AND APPARATUS FOR DISCRIMINATING WITH RESPECT TO LOW ELEVATION TARGET OBJECTS

FIELD OF THE INVENTION

The invention pertains to radar systems. More particularly, the invention pertains to the determination of the elevation or height of a target object.

BACKGROUND OF THE INVENTION

Radar is used in many applications to detect target objects such as airplanes, military targets, and vehicles. A relatively recent application for radar is in radar systems for automobiles. Automotive radar systems are known for use in helping drivers to park their cars, to follow traffic at a safe distance, and to detect driving obstacles. In such applications, when the radar system detects an obstacle or the slowing down of traffic in front of the vehicle, it may issue a warning to the driver, such as a beep or warning light on the dashboard, and/or actually control the vehicle in some way, such as by applying the brakes, in order to avoid an accident.

Typically, a radar system detects the range (i.e., distance) to a target object by determining the roundtrip delay period between the transmission of a radar signal and the receipt of the signal returning back to the radar after it bounces off of the target object. This round-trip delay, divided in half and then multiplied by the speed of the radiation, c, gives the distance between the radar system and the target object (assuming the transmitting antenna and the receiving antenna are the same antenna or very close to each other). The location of the target object typically is determined in one of three general ways. In one technique, the radar beam is narrow such that the bearing to the target object is given by the direction in which the beam is pointing, in both azimuth and elevation, when it sends out a signal that results in a return signal reflected off of a target object. The combination of the bearing, the elevation, and the range gives the location of the target object. In the second technique, a plurality of radar transmitters and/or receivers can be arranged in an array and the range information collected from the multiple transmitters and/or receivers can be correlated with each other to determine the location of the target object via trilateration. Particularly, the knowledge of the range of a target object from a known location (e.g., a particular receiver) defines a sphere on which the target object must lie, that sphere being the sphere that is centered at the radar receiver and that has a radius equal to the measured range. By determining the range sphere for a single target object from a plurality of different receivers at different locations, one can calculate the locus of points where all of those spheres intersect. In many practical applications as few as three receivers is sufficient to provide enough data to uniquely identify a single point at which the target object lies. In a third technique for detecting the azimuth and elevation of a target object known as monopulse radar technique, the relative amplitudes of the reflected signal from two or more radar antennas, with common coverage in azimuth, elevation and range, are used to determine azimuth and elevation angles.

Although many radars locate target objects in range, azimuth (or bearing), and elevation, typical automotive radars ignore elevation. However, nuisance objects that cause undesired radar detections (such as extremely low target objects that a car could easily traverse) may require some discrimination in elevation or height.

One example where elevation discrimination may prove useful is in automotive radar systems used for obstacle avoidance, where it would be desirable to determine the height of a target object in front of the vehicle and toward which the vehicle is moving. Particularly, target objects below a certain height are probably of no danger to the vehicle or its occupants if the vehicle were to drive over that target object, whereas obstacles over a certain height probably would be dangerous to drive over or into. For instance, small objects such as aluminum cans and other small debris usually are perfectly safe for the vehicle to run over. In fact, any contoured object of significant mass or electromagnetic reflectivity (such as metal objects) could return a reflection to the radar system even when they are virtually at the ground level. Such obstacles include manhole covers and expansion joints in roadways.

Accordingly, it would be desirable for radar systems to discriminate between target objects based on the height. For example, it would be desirable for a vehicle radar system to distinguish between low target objects and high target objects so as to not issue a warning or apply the brakes unnecessarily frequently with respect to objects that are not truly obstacles or otherwise dangerous to the vehicle or its occupants.

SUMMARY OF THE INVENTION

The invention concerns a method and apparatus for estimating a height of a target object using radar signals reflected from the target object wherein a receiver detects a plurality of radar signals reflected from the target object, respectively, at a plurality of different ranges, resolves the amplitudes of the plurality of reflected signals at the respective plurality of different ranges to generate an amplitude data set, and determines if the amplitude data set correlates to a particular height.

DETAILED DESCRIPTION OF THE INVENTION

Figure 1:
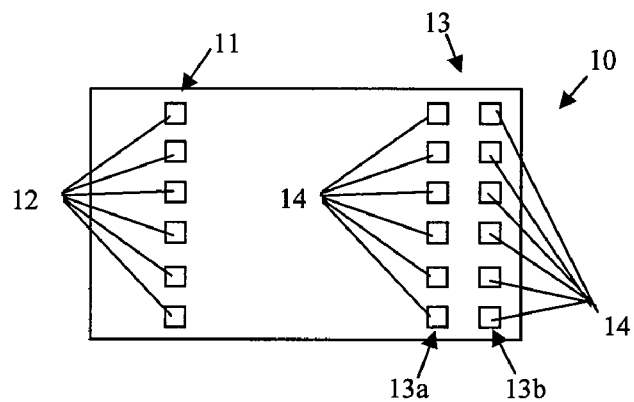
FIG. 1 is a diagram illustrating an exemplary radar array in accordance with an embodiment of the present invention.

FIG. 1 is a block diagram of an exemplary radar antenna array. The configuration of FIG. 1 is merely exemplary of a practical antenna array. The invention will work with essentially any radar system. This radar system 10 functions as a range/bearing radar through the use of one transmit antenna array 11 and two receive antenna arrays 13. The transmit antenna array 11 is comprised of a linear vertical array of six antenna elements 12. The receive antenna array 13 includes two linear vertical arrays 13a, 13b of six antenna elements 14. The six elements in each array are summed via microwave couplers and matched microwave distribution networks (not shown). A monopulse type algorithm uses the signals from both receive antenna linear arrays 13a, 13b to determine the azimuth of target objects that are within the range of the receiver. Since all six elements are summed to form the receive antenna elevation beam, there is only one elevation beam. Hence, with this configuration, target object elevation angle cannot be measured in the same way that bearing is measured in the azimuth plane.

The invention includes a technique for determining the height of a target object detected by a radar system. The technique disclosed herein is low cost and efficient. Particularly, it generally requires no modification to the hardware of a radar system since it can be implemented entirely in software.

Depending on the particular implementation, the system may be configured to determine the height of the target object as accurately as conditions permit or it may be configured to simply discriminate between target objects above a certain height and target objects below that certain height. For instance, in automotive radar for obstacle avoidance, it may be useful only to determine whether the target object is above or below a certain height. For instance, typically a vehicle can safely traverse an obstacle that is less than about one half of the bumper height of the vehicle, which typically might be about 34 cm above the ground, thus, dictating a discrimination height of about 17 cm.

Radar detection of target objects works by virtue of transmitting an electromagnetic beam from the transmitting antenna(s) 12 and then receiving reflections of that beam off of target objects within the path of the beam. Depending on the orientation of the surface or surfaces of the target object, electromagnetic radiation reflected off of the target object may or may not make it back to the receiving antenna(s) 14. Commonly, however, target objects will reflect some portion of the radiation back to the radar receiving antenna off of some point or the surface of the target object. In fact, reflected radiation may be returned to the receiving antenna off of multiple points or surfaces of the target object. However, as a practical matter, most objects have one or a small number of reflection points that reflect the radar energy back to the receiving antenna. Generally, a radar can see features as small as about one half the wavelength of the radar. Thus, an exemplary 24 GHz radar (corresponding to a wavelength of 1.24 centimeter) has a resolution of less than 1 cm. At this resolution, the radar receiver frequently will receive multiple reflections off of multiple points on a typical object that might be encountered on a roadway, but one point usually dominates. Accordingly, in many practical applications, it is safe to use the single predominant path of reflections off the target object for detection purposes. Furthermore, algorithms are well-known and in wide use that can process the return signal received at a receiving antenna and make a prediction as to the location and/or range of the target object, which reflected beams correspond to the same target object, and generally which information most accurately reflects the true nature of the target object.

Continuous-wave radar systems as well as pulsed radar systems are well known and either type can be used in connection with the present invention.

In addition, target objects that are close to the ground or another large surface, but have a non-negligible height or distance above the ground, typically will not only reflect radiation directly back to the radar receiver, but also reflect radiation that bounces off the ground and returns to the radar receiver. This phenomenon is known as multipath and is usually considered an undesirable interference signal. Algorithms are known for compensating for multipath interference.

The present invention actually uses this multipath phenomenon to determine the height of a detected target object. Specifically, the ground is a large, generally planar surface that is close to target objects near the ground. Thus, for target objects at a non-negligible height or distance above the ground, there usually will be an indirect reflection path from the target object off of the ground and back to the receiving radar antenna. Furthermore, if the ground is generally planar without significant abnormalities of a size equal to or larger than the radar signal's wavelength, as would typically be the case for an airplane runway or an automobile roadway, for instance, there will only be one significant indirect reflection path off of the ground back to the receiving radar antenna.

Figure 2:
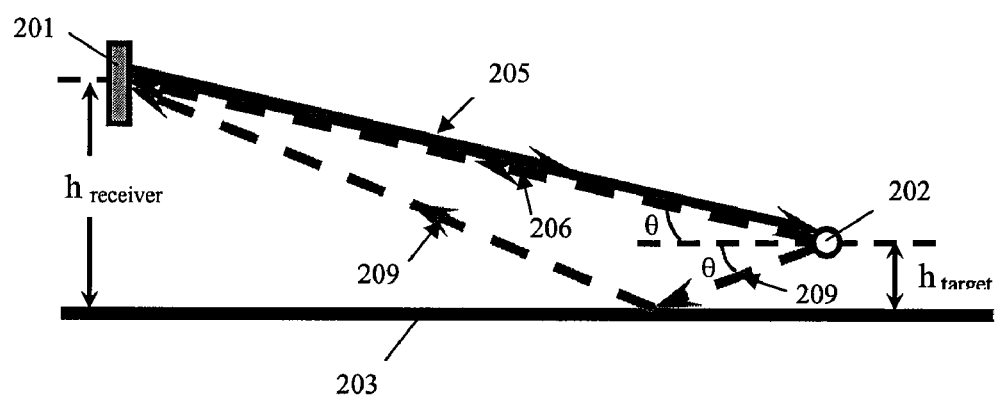
FIG. 2 is an elevation view illustrating a radar system detecting reflections from a target object in accordance with an embodiment of the present invention.

This is illustrated in the diagram of FIG. 2. In this diagram, the radar receiver (e.g., a receiving antenna) is shown at 201. The receiver is a known height, $h_{receiver}$, above the ground 203. The remainder of the radar system is not shown in order not to obfuscate the figure. Likewise, in order not to obfuscate the discussion, the target object is assumed to be an idealized spherical point target object 202 that is a distance (or range), r, from the radar receiver 201. This assumption, in fact, can be made for purposes of processing the incoming real time data in connection with the present invention without significant loss of accuracy in predicting target object heights. In this figure, the transmitting antenna and the sensing antenna are the same antenna, although this is merely exemplary and different receive and transmit antennas, such as illustrated in FIG. 1 may be employed.

Since the multipath phenomenon occurs naturally for all target objects and changes characteristics with target object height, it provides a way to discriminate target objects by their height and/or distance above the ground. FIG. 2 illustrates the spatial relationship between a radar receiver 201 and an ideal point target object 202, both at arbitrary height from the ground 203. FIG. 2 assumes a simplistic ray optics geometric multipath model. It should be understood that the radar typically will transmit a broad wave front which is not illustrated in FIG. 2 and that the radiation reflects off the target object 202 in many directions, including many directions that bounce off the ground, but only a few reflection paths reflect energy back to the receiver. As shown in the figure, some of the transmitted radar signal 205 hits the target object 202 and returns in a direct reflected signal path 206 to the receiver 201. The direct reflected signal's propagation path can be considered to be the same as the transmitted signal's propagation path, but in the opposite direction.

In addition to the direct reflected radiation 206 that hits the receiver 201, some of the radiation also is reflected off the target object 202 toward the ground 203 and is then reflected off the ground back to the receiver 201.

Generally only a fraction of the energy will bounce off the ground and make it back to the receiver as illustrated by path 209. The angle of reflection off the target object of the indirect path, $-\theta$, is equal to the transmitted signal path's angle of incidence, $\theta$, but opposite in polarity. The amplitude of the direct reflected signal 206 off of a target object taken alone generally will increase monotonically as the distance between the radar and the target object decreases. Particularly, it increases inversely to the distance at about $r^4$, where r is the range or distance to the target object. However, if there is multipath interference from an indirectly reflected beam 209, then the direct reflected beam 206 and the indirectly reflected beam 209 will interact with each other and change the combined received signal's characteristic shape from the standard range dependent, $1/r^4$ amplitude curve that would be expected in the absence of multipath.

The direct and the indirect path signals both propagate back to the receiver 201 and add constructively or destructively as the range to the target object 202 changes. The combined received signal amplitude as a function of target range consists of peaks and nulls that shift in range for different target heights.

The amplitude of the received total signal, therefore, will change as a function of the distance between the radar receiver 201 and the target object 202 and, therefore, the amplitude will fluctuate up and down with peaks and nulls as a function of distance. It will not look like the monotonically increasing amplitude as one moves closer to the target object expected in the absence of multipath interference. Generally, low targets have amplitude patterns with few peaks and nulls that are relatively far apart. Higher target objects have amplitude patterns with more peaks and nulls that get closer together with increasing height.

Target objects of the same height relative to the ground plane 203 should generally have the same amplitude pattern as a function of distance from the radar, while target objects of different height will have different amplitude patterns as a function of distance.

Figure 3:
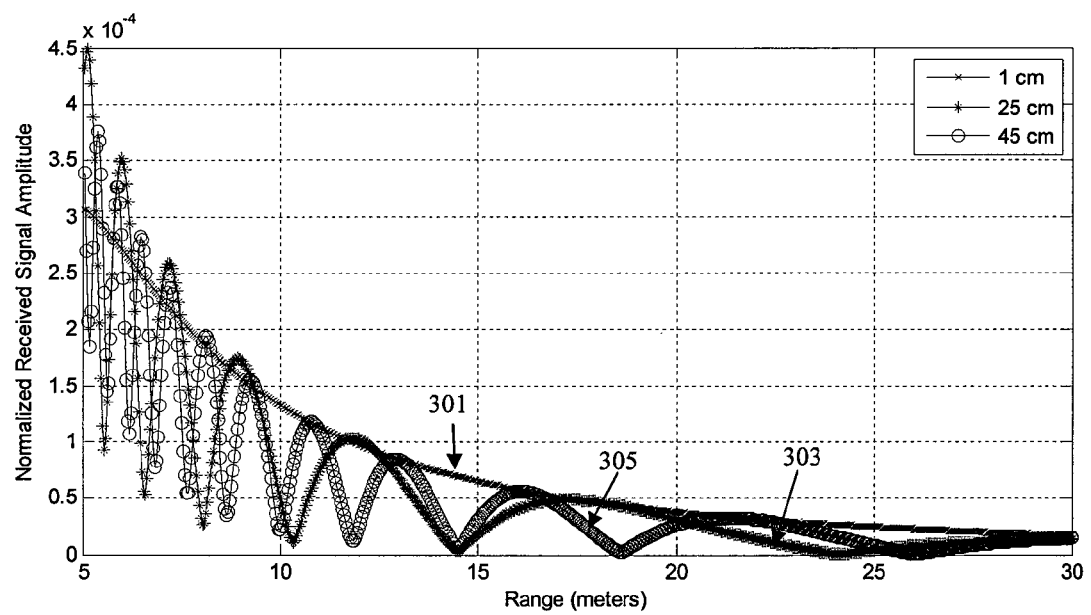
FIG. 3 is a graph showing exemplary amplitude data as a function of range (between 5 meters and 30 meters from the radar receiving antennas) for three target objects, each at different heights.

FIG. 3, for instance, is a plot illustrating simulated noiseless, normalized target amplitude for target objects at three different heights above the ground, namely, 1 cm, 25 cm, and 45 cm, over a range from 5 m to 30 m as a function of range assuming a radar receiving antenna that is placed 47 cm above the ground. Curve 301 shows the data for the target object 1 cm off the ground. Note that the multipath interference effect is minimal and the curve 301 very closely approximates the monotonically varying amplitude versus range curve that would exist in the absence of multipath. However, for the target object that is 25 cm off the ground as illustrated by curve 303, the amplitude of the return signal on average still generally increases inversely to distance, but has substantial fluctuations up and down as a function of distance. The fluctuations increase in amplitude and frequency as the distance gets smaller. Referring now to the third curve 305, which represents the information for a target object that is 45 cm off the ground, it also has substantial fluctuations in amplitude as a function of distance while, nevertheless, generally, on average increasing as the distance between the target object and the receiver decreases. However, note that the fluctuations of curve 305 have a distinctly different pattern than the fluctuations of curve 303 corresponding to the target object that is 25 cm off the ground.

Thus, one can predict the height of a target object by examining the amplitude versus distance curve created by observing the amplitude of the signal at the receiving antenna over a range of distances as the target object gets closer to the antenna.

Figure 4A:
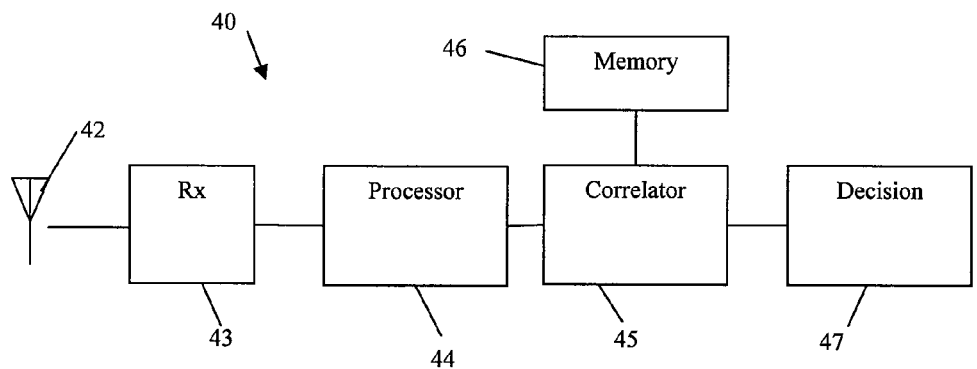
FIG. 4A is a block diagram illustrating basic components of a radar system in accordance with a particular embodiment of the present invention.

FIG. 4A is a block diagram illustrating basic components of the receive path 40 of a radar system in accordance with a particular embodiment of the present invention. It should be understood that FIG. 4A only illustrates components significant to the present invention and that a typical radar system will include substantial additional circuitry for performing functions not discussed herein. Further, it should be understood that the block components shown in FIG. 4A correspond to processes and do not necessarily represent physical components. The processes described below for the various blocks would normally be performed by one or more digital data processing apparatus, such as microprocessors, computers, state machines, ASICs (Application Specific Integrated Circuits), combinational logic. Certain functions, particularly those performed in the receive circuitry, such a frequency down conversions and filtering, may be performed by analog circuitry.

Reflected signals are received from antenna 42 into a receive circuit 43. The signals are processed by receive circuit 43 in conventional fashion (filtering, frequency conversion), converted to digital data and provided to processor 44. Processor 44 extracts the amplitude data from the received signals and builds a data set containing information as to the amplitude of the received signals corresponding to a particular target object as a function of range. A correlator 45 compares this data to amplitude versus range data for target objects of various heights stored in memory 47 and determines a best match between the incoming data and the stored amplitude versus range data sets (hereinafter amplitude data sets). A decision circuit 46 decides which height to declare based on the output of the correlator 45. As discussed in further detail below, in some cases, the decision may be to wait for additional information to come in before declaring a height.

In a preferred embodiment of the invention, data is collected in real time and compared to stored amplitude data sets comprising the characteristic amplitude versus distance characteristic of target objects of the various heights. For instance, depending on the desired resolution, range of distances, and relevant height range, one can collect empirical data to create these curves and store the information in memory for comparison to the real-time data.

For instance, using an automotive obstacle avoidance radar as an example, such systems might have a maximum range of about 30 meters for detecting target objects, a desired distance resolution of 5 cm, a maximum height range of 50 cm, and a desired height resolution of 1 cm. Thus, one could place a target object that is 1 cm high 30 meters away from the radar and collect the amplitude data. Then one could move 5 cm closer to the target object and collect the amplitude data at this distance. This can be repeated in 5 cm increments from 30 m down to 5 cm. This process could then be repeated for a target object that is 2 cm high and then for a target object that is 3 cm high, etc., up to 50 cm. From this data, one can create and store the characteristic amplitude versus range curves for target objects of varying heights from 1 cm to 50 cm over the range from 30 m to 1 cm. Alternately, the characteristic range-dependent amplitude curves may be generated via a mathematical model. In a preferred embodiment of the invention, the curve data is compressed into one or a few metrics highly indicative of the shape of the amplitude versus distance curve over the specified distance spectrum.

Then, software can collect real-time data as a vehicle approaches a target object, compare that real-time data to the various stored amplitude data sets, find the best candidate matches, and then declare as the height of the target object the height corresponding to the best matched candidate curve or, for additional safety, the one of the handful of most closely matched candidates that represents the highest height.

The distance over which data is collected before a comparison is performed will depend on the particular application. For instance, using the automotive obstacle avoidance radar as an example, it may have a maximum detection range of 30 m. Furthermore, the determination typically will need to be made while the target object is still some minimum distance away from the vehicle in order to provide sufficient time for the vehicle to stop before striking the object or swerve around the object. Accordingly, in this specific embodiment, one might choose a distance range of 30 to 10 m. In a preferred embodiment of the invention, the distance range for making a comparison and a decision as to the height of the target object is variable. For instance, if there is little noise and the target object is highly reflective with only one significant reflection point, a very accurate prediction may be able to be made as to the height of the target object with the data over a range of as small as 5 meters (e.g., from 30 m to 25 m range). Accordingly, a detection algorithm may be configured so that it declares a height much earlier (while the vehicle is much further away from the target object) when the data is clear and consistent as compared to when the data is less clear and consistent.

In many situations, it will be safe to employ algorithms that assume that the detected target objects are idealized point objects. Also, algorithms are known and can be employed to discriminate between reflections off multiple points on a single target object and determine the strongest reflection.

While there is no guarantee that the primary or even the highest reflection point off of a target object accurately reflects the height of the target object, as a practical matter, it generally tends to be a rather accurate predictor of the height of the target object.

The absolute amplitude of the return signal can vary based on many conditions that are not a function of the height of or distance to the target object, including environmental conditions (rain, fog, object radar cross section). Thus, it is preferable to use the relative amplitude of the signal, rather than the absolute amplitude. In other words, it is the shape of the amplitude versus range curve that is most accurately indicative of the height of the target object, as opposed to absolute amplitude values.

In one preferred embodiment, there are two basic components of the invention, namely:
  a. predicting the target object's amplitude response as a function of range for all possible target object heights (i.e., generating the stored amplitude versus range data sets); and
  b. matching the received target object signals to one of the stored amplitude data sets associated with a particular target object height.

In many applications it may not be necessary to determine the precise height of the target object, but merely whether it is above or below a certain threshold height. For instance, in automotive obstacle avoidance applications, it may be sufficient to determine whether or not the target object is greater in height than ½ the bumper height of the vehicle. In such applications, a third step may be added, namely:
  c. applying detection criteria and thresholds to determine if the target object is a candidate for elimination (e.g., if the target object is less than the threshold height for issuing a warning or applying the brakes).

The first component, the predicting component, may be implemented by an existing mathematical multipath prediction model. The second component, the signal matching component, may be implemented by a multiple bank correlator with banks containing normalized versions, or replicas, of each possible received target object signal for various target object heights at a desired height resolution and range, e.g., from 0 to 50 cm in 1 cm increments. The last component, the detection component, uses adaptive thresholding techniques and detection criteria derived from both simulated target object amplitude data and live target object amplitude data. The three components of the algorithm are discussed in greater detail in the three sections below.

Multipath Prediction Model

Any suitable multipath prediction model may be used to generate the expected signal replica data sets (amplitude versus range models for different height target objects) that will be used in the multiple bank correlator. Note that, while we refer to the models as amplitude versus range models, the data need not be stored directly in the form of amplitude versus range, but can be stored in any reasonable form to minimize memory requirements. For instance, any number of algorithms is known for reducing large amounts of data such a graphical plot data, into one or a few metrics. In one preferred embodiment, the model uses a geometric ray-optics technique to determine the relative amplitudes of the return radar signal as a function of target object range, target object height, target object radar cross-section, receiver height, receiver beam-width, receiver gain, complex ground reflection coefficient, and signal polarization (horizontal). Since the absolute return signal amplitude does not affect the correlation of the return signal with the stored amplitude data sets, the transmitted signal power is normalized to unity. The return signal amplitude is predicted for each candidate height (e.g., 0-50 cm in 1 cm increments) and for each range of interest (e.g., from zero to the maximum range of the radar. The data need not be continuous, but can be at reasonable discrete intervals taking into the consideration the radar cycle time and the maximum vehicle velocity at which the system is intended to work.

Multiple Bank Correlator

As previously noted, the range dependent radar return signal amplitude response from an ideal point target object at a specific height has a characteristic shape. This suggests that extracting information from these signals regarding target object height is possible. There are M possible received radar signals, each corresponding to a specific target object height. For purpose of illustration, the analog representation of these signals can be expressed as:

$$S_m(t) = Re[u_m(t)e^{j2\pi f_c t}], m=1, 2, \ldots, M \quad (1)$$

The $u_m(t)$ are the equivalent non-orthogonal, low pass signals; $f_c$ is the carrier frequency of the radar signal (24 GHz). The transmission channel adds attenuation $\alpha$ and a phase shift $\phi$. The received radar signal model now becomes:

$$r(t) = \alpha e^{-j\phi} u_m(t) + z(t) \quad (2)$$

The signal, z(t), is additive white Gaussian noise (AWGN). Although $\phi$ can be resolved precisely via carrier phase measurement, it is ambiguous due to the receiver's limited range accuracy of 4 cm (1σ). A target object movement in range equal to one-half of the wavelength of the transmitted radar signal, 0.625 cm, results in 1.25 cm of round-trip path-length change. This forces a non-coherent detection scheme that is independent of signal phase measurement and that relies only on the received signal's amplitude.

A cross-correlation scheme was employed to compare the received radar amplitude data set, r(t), with the stored amplitude data sets, $u_m(t)$. Assuming that all the possible signals are equally likely with equal energy, the following decision variables are computed:

$$U_m = \left| \int_{t=0}^{t=T} r(t) u_m^*(t) dt \right| \quad (3)$$

Figure 4B:
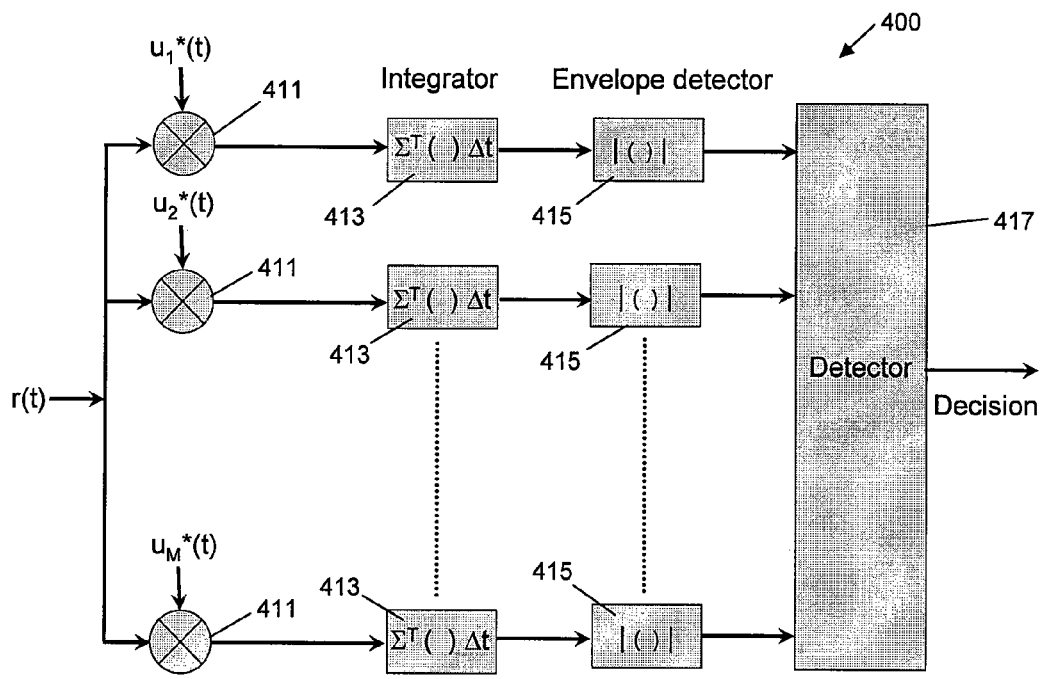
FIG. 4B is a block diagram of a detection algorithm in accordance with an embodiment of the present invention.

FIG. 4B shows a basic multiple bank correlator 400 that can be used as correlator 45 of FIG. 4A. Each row of the correlator comprises a multiplier 411, followed by an integrator 413 and an envelope detector 415. The outputs of the correlators are fed into a detector 417 that compares the values of all the decision variables and selects the most likely candidate signals. Each decision variable represents the correlation of the received amplitude data set with the stored amplitude data set for each possible target object height. A conventional cross-correlator delays the input signal, multiplies it with the complex conjugate of the stored amplitude data set and integrates the product of the signals. For this application, the received radar amplitude signals preferably are indexed by range so there is no need to delay one signal with respect to the other before the multiply (in multiplier 411). Instead, the amplitudes for each signal that correspond to each specific range are multiplied and integrated only once without an applied delay.

When the detector chooses a particular decision variable, the target object height associated with that particular decision variable is declared as a candidate target object height. According to classical detection theory, the optimum demodulator for signals with random phase in AWGN is a correlator or matched filter followed by a detector that selects the candidate decision variable with the largest value. This works well if the predicted signals form an orthogonal or highly uncorrelated signal set. Since this is not the case here, an alternative detector was employed and is discussed in the next section.

For this particular application the correlation values were normalized. Normalizing and substituting the discrete variable "n" for "t" and "N" for "T" yields:

$$R_i[N] = \frac{\frac{1}{N}\sum_{n=1}^{n=N} r[n]*u_i[n] - \frac{1}{N^2}\sum_{n=1}^{n=N} r[n]\sum_{n=1}^{n=N} u_i[n]}{\sigma_r \sigma_{ui}} \quad (4)$$

where:
$R_i[N]$=the correlation values formed by the correlation of the N measured amplitudes and the "$i^{th}$" predicted signal amplitude set;
$r[n]$=the measured received signal amplitudes for each measured range;
$u_i[n]$=the $i^{th}$ predicted received signal amplitude set for each measured range;
N=the total number of radar range and amplitude measurements thus far;
$\sigma_r$=the standard deviation of the measured received signal amplitudes; and
$\sigma_{ui}$=the standard deviation of the $i^{th}$ predicted received signal amplitude set.

Figure 5:
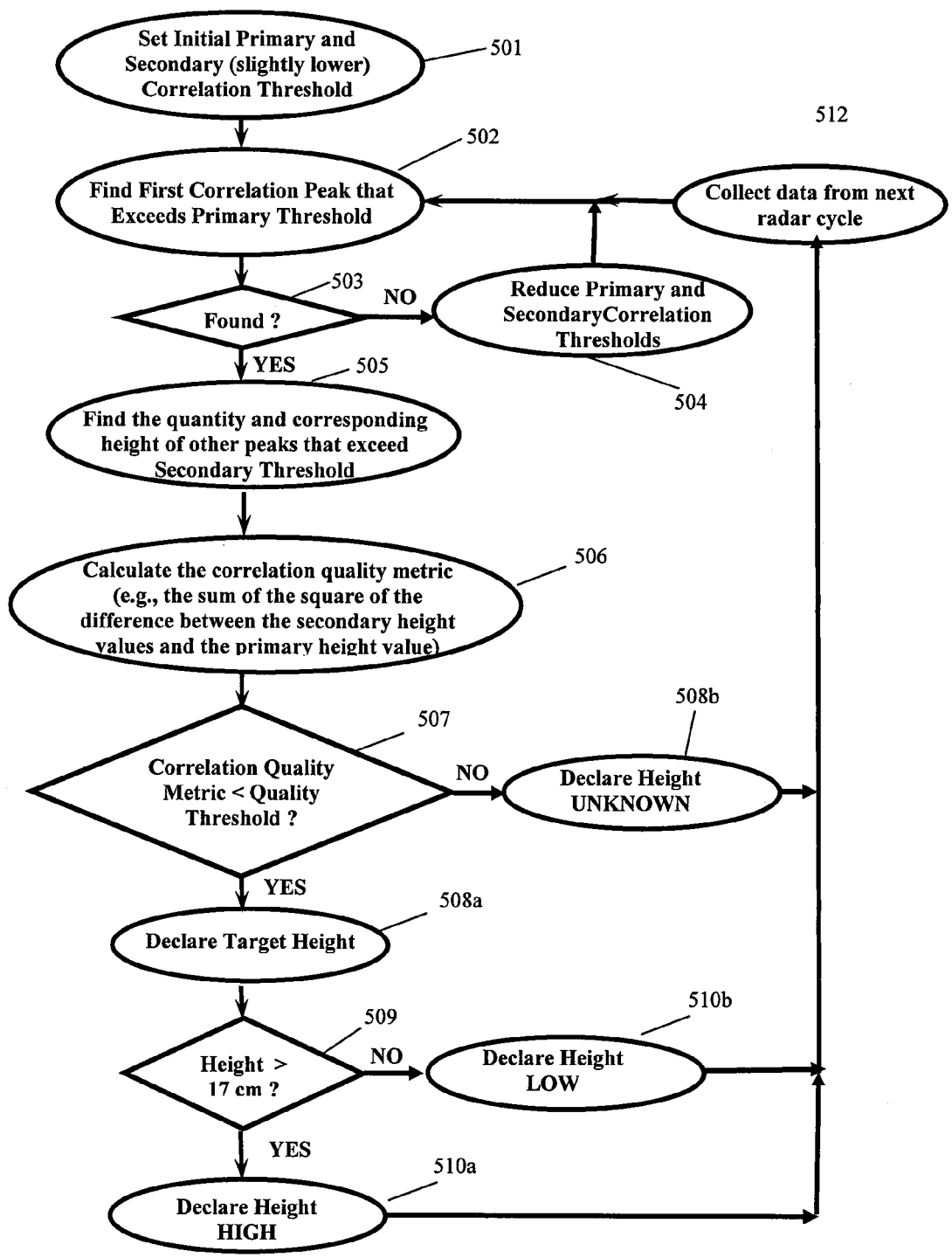
FIG. 5 is a flow diagram illustrating a process for determining the height of a target object in accordance with an embodiment of the present invention.

Equation (4) can be reduced to the following:

$$R_i = C_{rui}/\sigma_r \sigma_{ui} \quad (5)$$

where:
$C_{rui}$=the covariance of the measured received signal amplitudes with the "$i^{th}$" set of predicted received signal amplitudes, $u_i(n)$ Detector In one embodiment of the invention, the detector may simply select the $u_i[n]$ with the highest correlation and declare the associated height as the most likely target object height. This detection scheme may be sufficient in many applications. However, depending on environment (e.g., noise), desired height resolution, desired distance resolution, and desired accuracy, this simple scheme may not provide acceptable accuracy. FIG. 5 is a flow diagram illustrating another embodiment adapted for automotive obstacle avoidance radar applications in which it is sufficient to accurately determine only whether the obstacle is greater than or less than a given height threshold. This series of functions is conducted for each radar receiver computation cycle.

As shown in FIG. 5, an initial primary correlation threshold is set in step 501. This is a minimum threshold over which the input signal must correlate to a stored amplitude data set in order to be considered a match. The threshold value may be chosen based on simulation results and correlation results of several live target objects. The decision variables comprise the cross-correlations of the received amplitude data set with the stored amplitude data set for each possible target object height. In a preferred embodiment, a secondary, slightly lower threshold also is set for use in calculating a correlation quality factor, to be discussed further below.

In step 502, the detector searches the decision variables for a correlation peak above the primary threshold (i.e., whether the correlation between a stored amplitude data set—corresponding to specific height—and the live data is greater than the current correlation threshold). With reference to step 503, if all of the decision variables are searched and there are no correlation peaks above the threshold, the threshold is lowered (step 504) and step 502 is repeated. This is done iteratively for the current radar receiver cycle (40 milliseconds per cycle) until at least one correlation peak is found above the current threshold. The correlation is continuously updated for successive radar receiver cycles (i.e., different ranges if the vehicle is moving) as the host vehicle approaches the target object of interest.

In step 505, after a correlation peak is found greater than the primary threshold, the algorithm looks for correlation peaks below the primary threshold and above the secondary threshold. In step 506, the algorithm takes into consideration the magnitudes and quantity of these secondary peaks to generate a correlation quality metric indicative of the likely accuracy of the correlation peak that is above the primary correlation threshold.

The metric, for instance, might be the sum of the squares of the difference(s) between the primary peak and the secondary peak(s). In this case, the lower the metric, the fewer the differences and thus the better the quality of the primary peak (the higher the likelihood that it corresponds to a good height prediction). For instance, a greater number of secondary correlation peaks generally would be indicative of a lesser likelihood that the primary peak is of high quality. On the other hand, when the secondary peak(s) correspond to heights that are close to the height to which the primary peak corresponds, this would tend to indicate a greater likelihood that the primary peak quality is good as opposed to when the secondary peak(s) correspond to height(s) far from the height to which the primary peak corresponds. The sum of the squares of the differences takes both of these factors into consideration and renders a lower value for the correlation metric as the quality of the guess increases, Of course, the complete lack of any secondary peaks would be indicative of the primary peak being of very high quality, yet the metric would yield a value of zero. This anomaly can be easily corrected by making a special exception when there are no secondary peaks, such as automatically declaring the height corresponding to the primary peak as the height of the target object.

In decision step 507, it is determined if the correlation quality metric is above or below a predetermined quality threshold. If above (indicating poor quality), flow will proceed to step 508*b*, where the algorithm declares the height unknown. Flow proceeds to step 512 where more data is collected in the next radar cycle as the radar moves closer to the target object. After step 512, steps 502 et seq. are repeated for the next radar cycle.

On the other hand, if the correlation quality metric is below the threshold (indicating a high quality), flow will proceed from decision step 507 to step 508a, where the target object height will be declared as the height corresponding to the correlation peak above the primary correlation threshold.

Next in step 509, it is determined if the selected height is above or below the designated discrimination height, e.g., 17 cm. If greater than or equal to 17 cm, the target object is declared as a high elevation target object (step 510a). If less than 17 cm, the target object is declared as a low elevation target object (step 510b). In either event, flow then proceeds from either step 510a or step 510b through steps 511, 512 and back to step 502 so as to repeat the process for the next radar cycle.

Another technique that may be employed to help improve accuracy is to record the correlation data at each distance and assign the data at each distance a metric (herein termed a filtered target class metric) that indicates the best predicted height at that distance, accumulate that data and if the data over a predetermined number of distances is sufficiently consistent, declare the height. For instance, in one simple embodiment for an automotive obstacle avoidance system in which the discrimination height is 17 cm, the correlation data calculated at each distance is assigned a value of plus one if it predicts that the height of the target object is above 17 cm, minus one if it predicts that the height of the target object is below 17 cm, and zero if no decision can be made yet. Then, after the correlation data has been calculated for a certain minimum number of distances, the plus ones are summed and the minus ones are separately summed and, (1) if the positive sum divided by the number of total data points is above a certain positive value, and the negative sum divided by the number of total data points is greater than a certain negative value, the system declares that the height of the target object is above 17 cm, (2) if the positive sum divided by the number of total data points is below a certain positive value, and the negative sum divided by the number of total data points is less than a certain negative value ,the system declares that the height of the target object is below 17 cm, and (3) if the two normalized sums are between the aforementioned positive and negative values, the system decides that it cannot yet accurately predict the height of the target object.

Further Considerations and Alternative Embodiments

If it is found that some stored amplitude data sets corresponding to certain heights are very similar to other stored amplitude data sets having significantly different heights, leading to errors, it may be advisable to eliminate the stored amplitude data sets for some of those heights from the correlator database. For instance, simulations revealed that some low target objects (particularly those with heights equal to 1, 3, 4, and 7 cm) correlate well with high target objects. In a system that merely needs to discriminate between target objects above and below a single threshold height, it may be advisable to eliminate some of these amplitude data sets from the correlator database. For instance, with the detection algorithm outlined above in connection with FIG. 5 used in connection with automotive obstacle avoidance, one might eliminate the amplitude data sets corresponding to 1, 3, 4, and 7 cm from the correlator database. This would eliminate or decrease the number of erroneous determinations that a target object that is actually over the threshold height is erroneously determined to be below the threshold height. On the other hand, it also would increase the number of erroneous determinations that a target object that is actually below the threshold height is erroneously determined to be above the threshold height. However, the former is much more preferable than the latter.

Performance also may be improved via a more robust detection algorithm and fine tuning of the target object height and correlation thresholds. For example, instead of using only one correlation value for each peak that exceeds the primary and/or secondary correlation thresholds, three or more points could be used to give some idea of the relative height or width of each correlation peak. The average value of the correlation function over all possible target object heights, when compared with the correlation peak values, could yield additional information on the correlation peak widths and relative heights that could further reduce height estimation errors.

In the collection of the real-time amplitude data, there may often be multiple target objects detected by the radar. This is a common occurrence in radar use and multiple target object trackers are well known to segregate reflected radar signals amongst multiple target objects. A typical automotive radar system would likely include multiple target object tracking hardware and/or software and this could be used to segregate said reflected radar signals amongst said multiple target objects for purposes of collecting the amplitude data for a plurality of traced target objects simultaneously.

In addition, often the radar will lose track of a target object over a period of time (or over a certain distance) only to pick it up again. This drop out can be caused by any number of factors. In fact, it could be the result of destructive phase interference between the direct reflected signal and the indirect reflected signal off the ground being so complete that the amplitude of the received signal drops below the sensitivity range of the radar for a period of time. In a preferred embodiment of the invention, the software maintains the tracking data as well as the amplitude data for a target object that has dropped out for at least a predetermined period of time after it drops out and attempts to correlate target objects newly detected by the radar with target objects that dropped out to determine if a newly detected target object is instead the reappearance of a previously tracked target object that had temporarily dropped out. Preferably, it stores the correlation data, rather than the larger raw amplitude data set itself. The tracking data and the correlation data can be compared in order to make the decision as to whether they are the same target object and, if so, the correlation data for the target object before it dropped out and after it reappeared can be combined to provide a more complete correlation function for such target objects. The correlation data that is saved for each receiver computation cycle may include, but is not limited to, the sum of all of the past measured amplitudes, the sum of the square of the all of the past measured amplitudes, the sum of the product of all of the past measured amplitudes. It may further include, for all possible quantized target object heights, the stored amplitude data sets, the sum of all of the stored amplitude data sets, the sum of the square of all of the stored amplitude data sets,. Along with these data, the number of measured amplitudes, the last target object x, y coordinates, velocity in the x direction (Vx), velocity in the y direction (Vy), the elapsed time since the target object track was dropped, and the last estimated target object height may be saved.

The greatest improvement will be realized in crowded multi-target object environments with received signal dropouts occurring for each target object. Then, the range fragments for each target object would need to be "stitched" together to provide the most robust correlation values available to the height estimation algorithm.

Furthermore, in a preferred embodiment of the invention, the amplitude value is the scalar amplitude value. For instance, radars are often configured to split the received signal into a two channel complex signal, comprising an in-phase component, I, and a quadrature component, Q. The scalar amplitude value, A, would be $$A=(I^2+Q^2)^{1/2}$$

However, it also is possible to use complex amplitude. Particularly, using complex amplitude has the potential advantage of providing height correlation based on information over a very short distance, such as 10 to 20 cm. Particularly, when target objects are high and/or close to the radar, the fluctuations in complex amplitude may be huge over very short distances. The availability of phase information in such a situation can provide very high resolution range information, which could then be used to predict height using data over a very short range. Particularly, information as to the difference in phase between the direct reflected path and the indirect reflected path offers substantial range resolution within a single wavelength of the radar signal. Generally, using merely round-trip delay for determining distance could not provide nearly as high resolution range information as phase information would. Such phase information actually provides only fine resolution and cannot discriminate between distances greater than a wavelength of the radar system versus distances smaller than the wavelength of the radar system. Accordingly, in such an embodiment of the invention, round-trip delay would still be used for course range resolution information while phase would be used for fine range resolution information.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of estimating a height of a target object using radar signals reflected off of said target object, said method comprising the steps of:
   detecting a plurality of radar signals reflected from said target object, respectively, at a plurality of different ranges;
   resolving amplitudes of said plurality of reflected signals at said respective plurality of different ranges to generate a target object amplitude data set; and
   determining if said target object amplitude data set correlates to a particular height for said target object by comparing said target object amplitude data set to a plurality of stored amplitude data sets, each said stored amplitude data set corresponding to data representative of an amplitude data set corresponding to a target object of a particular height.

2. The method of claim 1 wherein said stored amplitude data sets comprise data as to a relative value of each amplitude in said data set relative to the other amplitudes in said data set.

3. The method of claim 2 wherein said stored amplitude data sets comprise fluctuations in said amplitudes as a result of super-positioning of waves reflected from said target object directly to a radar receiver and waves reflected indirectly from said target object to said radar receiver.

4. The method of claim 3 wherein said waves reflected indirectly from said target object are reflected off of the ground.

5. The method of claim 1 wherein said detecting comprises detecting radar signals reflected from multiple target objects and using a multiple-target object tracker to segregate said reflected radar signals amongst said multiple target objects.

6. The method of claim 5 further comprising the steps of:
   tracking multiple target objects;
   maintaining tracking and amplitude data for dropped target objects;
   responsive to detection of a new target object not previously observed, correlating tracking data of said new target object with said tracking data for any dropped target objects to determine if said new target object is likely to be one of said dropped target objects; and
   if said new target object is likely to be one of said dropped target objects, associating said amplitude data of said new target object with amplitude data of said dropped target object so as to collectively provide an amplitude data set comprising continuity of information for said particular target object.

7. The method of claim 1 wherein said amplitudes comprise scalar amplitudes.

8. The method of claim 1 wherein said amplitudes comprise complex amplitudes having in-phase and quadrature components.

9. The method of claim 1 where said determining step further comprises determining if said target object amplitude data set corresponds to a height greater than a predetermined height or a height less than said predetermined height.

10. The method of claim 1 wherein said determining step comprises:
    (a) selecting a similarity threshold for similarity between said target object amplitude data set and a stored amplitude data set;
    (b) determining if any stored amplitude data sets exceed said similarity threshold;
    (c) if at least one of said stored amplitude data sets exceeds said similarity threshold, selecting a one of said stored amplitude data sets exceeding said similarity threshold; and
    (d) declaring said height corresponding to said one of said amplitude data sets to be a height of said target object.

11. The method of claim 1 wherein said determining step further comprises:
    (a) selecting a similarity threshold for similarity between said target object amplitude data set and a stored amplitude data set;
    (b) determining if any stored amplitude data sets exceed said similarity threshold;
    (c) if at least one of said stored amplitude data sets exceeds said similarity threshold, selecting a one of said stored amplitude data sets exceeding said similarity threshold;
    (d) evaluating a predicted accuracy of said selected amplitude data set based at least in part on the relative similarities of other stored amplitude data sets to said target object amplitude data set as compared to said selected amplitude data set; and
    (e) if said predicted accuracy does not exceed a predetermined level, continuing said detecting step at the further different ranges; and
    (f) if said predicted accuracy does exceed said predetermined level, declaring said height corresponding to said one of said amplitude data sets to be a height of said target object.

12. The method of claim 1 wherein said detecting step comprises detecting over a range of distances, wherein said range is about 30 m to about 10 m.

13. The method of claim 1 wherein said detecting step comprises:
after detecting said target object amplitude data over a first range of distances, determining if said target object amplitude data set correlates to a stored amplitude data set better than a minimum correlation threshold; and
if said target object amplitude data set does not correlate to a stored amplitude data set better than said correlation threshold, continuing said detecting step at further different ranges, supplementing said target object amplitude data sets with further data collected in said detecting step, and subsequently repeating said determining step.

14. A computer program product recorded on computer readable medium for estimating a height of a target object using radar signals reflected off of said target object comprising:
computer executable instructions for resolving amplitudes of a plurality of radar signals reflected from said target object, respectively, at a plurality of different ranges to generate a target object amplitude data set; and
computer executable instructions for determining if said target object amplitude data set correlates to a particular height for said target object; and
computer executable instructions for comparing said target object amplitude data set to a plurality of stored amplitude data, each said stored amplitude data set corresponding to data representative of an amplitude data set corresponding to a target object of a particular height.

15. The computer program product of claim 14 wherein said stored amplitude data sets comprise data as to a value of each amplitude in said data set relative to the other amplitudes in said data set.

16. The computer program product of claim 14 wherein said instructions for detecting comprises computer executable instructions for detecting radar signals reflected from multiple target objects and using a multiple-target object tracker to segregate said reflected radar signals amongst said multiple target objects.

17. The computer program product of claim 16 further comprising:
computer executable instructions for tracking multiple target objects;
computer executable instructions for maintaining tracking and amplitude data for dropped target objects;
computer executable instructions for, responsive to detection of a new target object not previously observed, correlating tracking data of said new target object with said tracking data for any dropped target objects to determine if said new target object is likely to be one of said dropped target objects; and
computer executable instructions for associating said amplitude data set of said new target object with said amplitude data set of said dropped target object so as to provide a collective data set comprising continuity of information for a particular target object if said new target object is likely to be one of said dropped target objects.

18. The computer program product of claim 14 where said instructions for determining further comprises computer executable instructions for determining if said target object amplitude data set corresponds to a height greater than a predetermined height or a height less than said predetermined height.

19. The computer program product of claim 18 wherein said instructions for determining comprise:
computer executable instructions for selecting a similarity threshold for similarity between said target object amplitude data set and a stored amplitude data set;
computer executable instructions for determining if any stored amplitude data sets exceed said similarity threshold;
computer executable instructions for, if at least one of said stored amplitude data sets exceeds said similarity threshold, selecting a one of said stored amplitude data sets exceeding said similarity threshold; and
computer executable instructions declaring a height corresponding to said one of said stored amplitude data sets to be a height of said target object.

20. The computer program product of claim 14 wherein said instructions for determining comprise:
computer executable instructions for selecting a similarity threshold for similarity between said target object amplitude data set and a stored amplitude data set;
computer executable instructions for determining if any stored amplitude data sets exceed said similarity threshold;
computer executable instructions for, it at least one of said stored amplitude data sets exceeds said similarity threshold, selecting a one of said stored amplitude data sets exceeding said similarity threshold;
computer executable instructions for evaluating a predicted accuracy of said selected amplitude data set based at least in part on the relative similarities of other stored amplitude data sets to said target object amplitude data set as compared to said selected amplitude data set; and
computer executable instructions for, if said predicted accuracy does not exceed a predetermined level, continuing said detecting step at the further different ranges; and
computer executable instructions for, if said predicted accuracy does exceed said predetermined level, declaring a height corresponding to said one of said stored amplitude data sets to be a height of said target object.

21. The computer program product of claim 14 wherein said instructions for detecting comprise:
computer executable instructions for, after detecting said target object amplitude data over a first range of distances, determining if said target object amplitude data set correlates to a stored amplitude data set better than a minimum correlation threshold; and
computer executable instructions for, if said target object amplitude data set does not correlate to a stored amplitude data set better than said correlation threshold, continuing said detecting step at further different ranges, supplementing said target object amplitude data sets with further data collected in said detecting step, and subsequently repeating said determining step.

22. A radar system comprising:
a transmitter for transmitting radar signals;
a receiver for receiving said radar signals reflected off target objects;
a processor for resolving amplitudes of said plurality of reflected signals at said respective plurality of different ranges to generate a target object amplitude data set; and
a correlator for determining if said target object amplitude data set correlates to a particular height for said target object; and a decision circuit for declaring as a height of said target object a height corresponding to a one of said stored amplitude data sets that best matches said target object amplitude data set;

wherein said correlator compares said target object amplitude data set to a plurality of stored amplitude data sets, each said stored amplitude data set corresponding to data representative of an amplitude data set corresponding to a target object of a particular height.

23. The radar system of claim 22 wherein said radar system is mounted on a motor vehicle.

24. The radar system of claim 22 wherein said decision circuit further determines if said target object amplitude data set corresponds to a height greater than a predetermined height or a height less than said predetermined height.

25. The radar system of claim 22 wherein said correlator selects a threshold for similarity between said target object amplitude data set and a stored amplitude data set, if any stored amplitude data sets exceed said threshold, if at least one of said stored amplitude data sets exceeds said threshold, selects a one of said stored amplitude data sets exceeding said threshold that corresponds to a greatest height, and declares said greatest height to be a height of said target object.

26. The radar system of claim 22 wherein said correlator selects a threshold for similarity between said target object amplitude data set and a stored amplitude data set, determines if any stored amplitude data sets exceed said threshold, if at least one of said stored amplitude data sets exceeds said threshold, selects a one of said stored amplitude data sets exceeding said threshold that corresponds to a greatest height, evaluates a predicted accuracy of said selected amplitude data set based at least in part on the relative similarities of other stored amplitude data sets to said target object amplitude data set as compared to said selected amplitude data set, and means for, if said predicted accuracy does not exceed a predetermined level, causes said processor to continue to resolve amplitudes of said plurality of reflected signals at further different ranges to generate said target object amplitude data set, and, if said predicted accuracy does exceed said predetermined threshold, declares said greatest height to be a height of said target object.

27. The radar system of claim 22 wherein said decision circuit, after detecting said target object amplitude data over a first range of distances, determines if said target object amplitude data set correlates to a stored amplitude data set better than a minimum correlation threshold, and if said target object amplitude data set does not correlate to a stored amplitude data set better than said correlation threshold, continues supplementing said target object amplitude data sets with data at further different ranges, and subsequently repeats said determining function.

* * * * *